Feb. 22, 1955 W. A. WALLEN 2,702,442
MOUNT FOR FISHING FLIES
Filed March 27, 1950

INVENTOR
Walter A. Wallen
BY Mason, Fenwick & Lawrence
ATTORNEYS

United States Patent Office 2,702,442
Patented Feb. 22, 1955

2,702,442

MOUNT FOR FISHING FLIES

Walter A. Wallen, Alexandria, Va.

Application March 27, 1950, Serial No. 152,022

2 Claims. (Cl. 43—57.5)

This invention relates to the art of fly fishing, and provides novel means for mounting fishing flies in fishermen's kits.

One of the objects of the invention is to mount the fly by the eye at the anterior end of the fly, this mode of mounting having the advantage of leaving the hook free to be grasped in selecting a fly, without the necessity of fingering the hackle, tails, or other fragile parts of the fly.

Another object of the invention is to provide mounting means in the form of a spring biased pivot cooperating clampably with a support and yieldable with respect thereto under lateral pressure when the eye of the fly is forced between said pivot and support, the eye being centered on said pivot and the latter pressing the eye with sufficient friction to normally maintain the fly in fixed position relative to the mounting means.

Still another object of the invention is the provision of a fly mount in which the mount cooperates with the eye to pivotally engage the eye with sufficient friction normally to maintain the fly in fixed position, but permitting it to be partially rotated to put it out of the way of closely adjacent flies, similarly mounted, making it accessible for removal without the risk of mussing or dislodging the neighboring flies. Close mounting of the flies is thus made practicable so that a relatively large number of flies can be carried in an orderly manner in a relatively small kit box.

A more specific object of the invention is the provision of a rotary holder comprising radially disposed fly mounts of the type described, which can be manipulated to bring the assortment of flies successively to a point of observation and selection.

Other objects of the invention will appear as the following description of a practical embodiment thereof proceeds.

In the drawing which accompanies and forms a part of the following specification, and throughout the several figures of which the same reference characters have been used to denote identical parts:

Figures 3, 4:
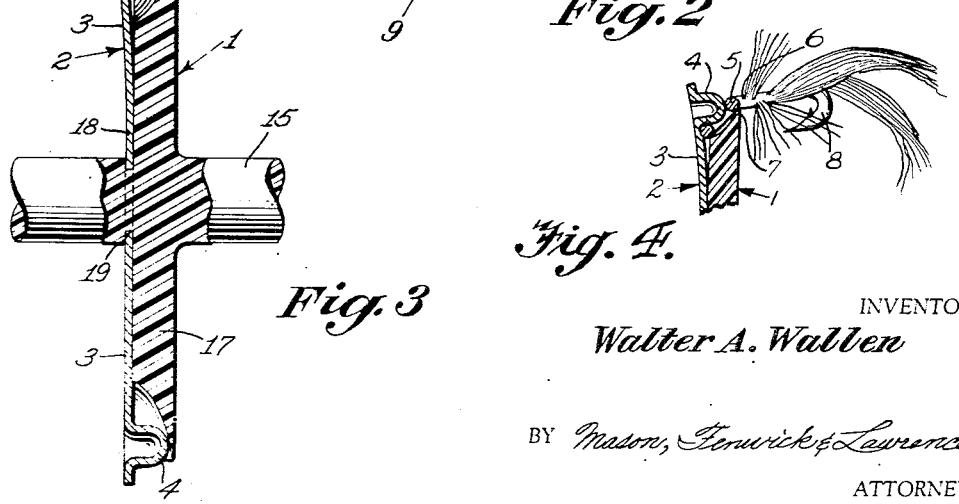
Figure 3 is a section taken along the line 3—3 of Figure 2.
Figure 4 is a fragmentary sectional view taken in the same plane as Figure 3, showing the fly tilted so that its body comes within one of the peripheral indentations of the fly mount.

Referring now in detail to the several figures, the broad concept of the invention which may best be understood from Figure 3, contemplates a holding device having a clamping function such as the rigid relatively fixed support 1, and the resilient relatively movable member 2, cooperating therewith. The member 2, as shown, comprises a leaf spring 3, anchored at its inner end in close juxtaposition to the support, having at its free end a projection 4 having a rounded end portion directed toward said support.

The rounded end of the projection 4 is made too large to pass through the circular eye 5 at the anterior end of the fly 6, so that when the eye is interposed between the support and the projection 4, the latter rests upon the rim of the eye, stressing the spring in a direction away from the support, developing a reaction pressure of the spring which creates sufficient pressure to hold the fly in position.

Since the end of the projection 4 is rounded, its peak or most anterior point extends within the eye, the projection thus being a pivot permitting the mounted fly to be rotated to the right or left of its normal fixed position, which has a utility, as will appear in the detailed description of the illustrated kit box.

The end of the support 1 with which the round ended projection 4 cooperates is concave both laterally and longitudinally, and tapering in a direction away from the free end of the support. This shape has the advantage that the eye of the fly clamped between the member 2 and support 1 is contacted by the latter in a circumferential line of contact of larger diameter than if the support were flat, thereby concentrating the frictional pressure at optimum points for holding the fly in place.

Some flies have the eye at an angle to the body shank, the ones shown in the drawing being of this type, in which case the end of the support is cut away to form an indent 7, (see Figures 2 and 4), the middle of the edge of which is just about intersected by the axis of the projection 4. The purpose of the indent is primarily to make room for the anterior portion of the body of the fly which is generally wound about the shank close up to the eye. The lateral portions of the concave end of the support which extend outwardly beyond the axis of the projection 4 serve to guide the eye into a central position with respect to the rounded end of the said projection.

In placing the fly in the mount it is grasped by the hook 8 (see Figures 1 and 4), and the eye 5 is forced between the concave surface of the support and the rounded end of the projection 4, spreading the members of the clamp against tension of the spring 3 until the eye is centered with respect to the projection 4, whereupon, the latter snaps into the eye under the urge of the spring pressure, resting upon the rim of the eye.

Figure 1:
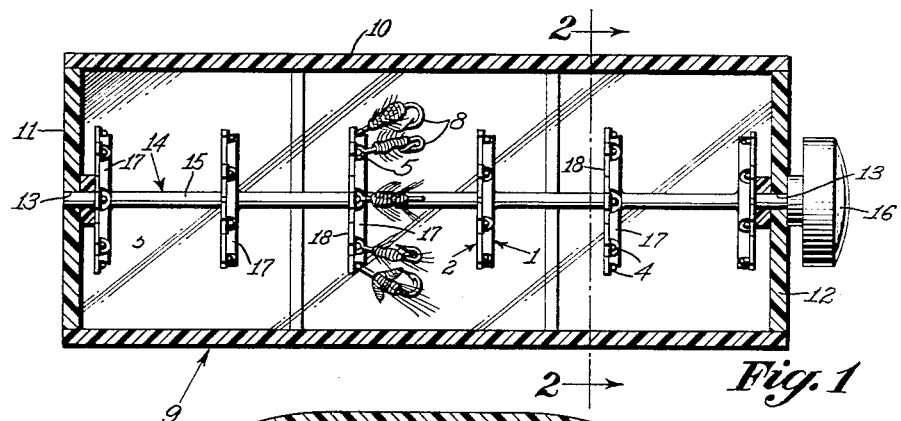
Figure 1 is an axial section through a fisherman's kit box, showing fly mounts which come within the purview of the invention.
Figure 2:
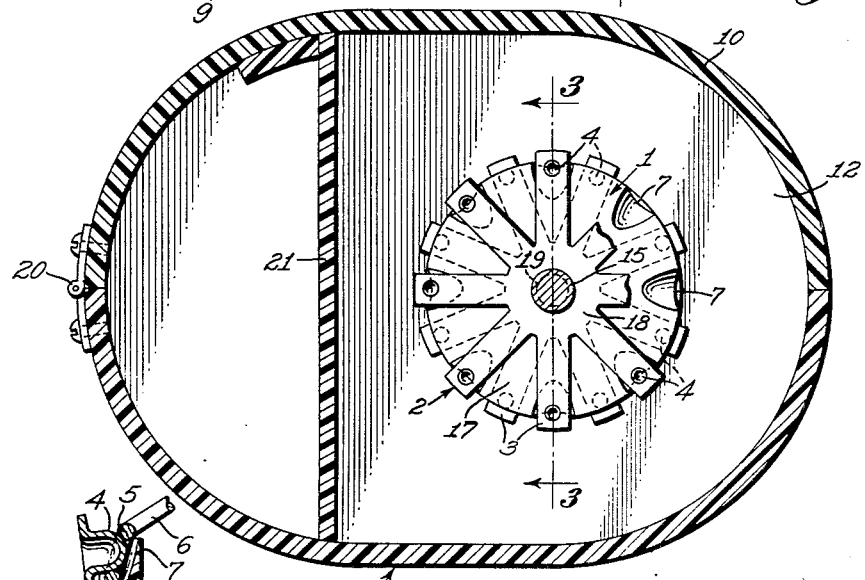
Figure 2 is a cross-section taken along the line 2—2 of Figure 1.

Referring now to the illustrative application of the invention to a fisherman's kit box, such a box is shown in Figures 1 and 2, designated as a whole by the reference character 9. This may be made of any suitable material, but is here shown as being of transparent plastic comprising the elongated oval body portion 10 and the end plates 11 and 12 which lie in parallel planes and have bearings 13 for the rotor 14 which carries the fly mounts. The rotor, as shown, is of molded plastic construction consisting of a shaft 15 having the external knob 16 at one end by which it may be rotated. Integral with the shaft 15 and at intervals along its length are the disks 17. A metal spider 18 is mounted against each disk and non-rotatable with respect thereto. A suggested way of fixing it is indicated in Figure 3, in which the spider has a central aperture 19, smaller than the diameter of the shaft 15, the latter having been molded with the spider in place so that the marginal portion of the spider which surrounds the hole 19 is fixedly embedded in the material of the shaft. The spider has the resilient arms which are referred to as the members 2 of the clamp, congruent radial portions of the disk 17 having been referred to as the support members 1 of the clamp. Therefore, at intervals along the shaft 15 there are a plurality of batteries, each consisting of a circumferential series of individual fly mounts. The shaft 15 is frictionally tight in its bearings in the end plates 11 and 12, so that normally the fly mounts remain in fixed position. The top part of the body portion 10 is separate from the lower portion, forming a closure which is hinged at 20. Upon turning the knob 16, any fly may be brought uppermost for observation or removal. In removing the fly, it is grasped by the hook 8 and pulled out from between the projection 4 and the concave face of the support. It is replaced by reversing this operation. In the act of removal or replacement it is not necessary to grasp the hackle, tails or other fragile portions of the fly. The fly mounts of each disk may be placed relatively close, since it is possible to rotate the adjacent flies about the projection 4 as a pivot, in order to move them away from the fly which is to be withdrawn, so that they will not be mussed or otherwise injured. Since the eye of the flies of the type shown is at an angle to the shank of the hook, the flies will lie at an acute angle with respect to the axis of the shaft 15, so that a kit box of relatively small diameter may be employed without the flies rubbing against the inside of the box. In the event that the eye is in the same plane as the shank of the hook, the flies in the kit box shown in Figure 1 would stand out more nearly perpendicular to the axis of the shaft 15, so that a kit box of larger diameter would be necessitated, which would be an inconvenience. To avoid this, the fly mounts would have to be deflected away from the radial position shown, into a position more nearly horizontal.

In Figure 2, the kit box 9 is shown, provided with a partition 21, dividing the interior of the box into two compartments, one of which contains the fly mounts, while the other is shown vacant, but adapted to contain any small pieces of fishing paraphernalia such as spoons, plugs, and hooks. The specific construction of the box does not, however, enter into the inventive concept, excepting insofar as it is related to the rotary fly mount supporting unit.

While I have in the above description disclosed what I believe to be a preferred and practical embodiment of the invention, it will be understood by those skilled in the art that the details of construction and arrangement of parts, as shown, are subject to modification and substitution of equivalents without transcending the scope of the invention.

What I claim as my invention is:

1. A mount for fishing flies that have an eye at the anterior end, said mount including cooperating clamp members, one being resilient and the other rigid, the opposing portions of said members comprising a projection on said resilient member having a rounded end portion and a concave seat in the rigid member, the projection and concave seat being normally closely confronting, the peripheral edge of said rigid member being indented at the outer end of said concave seat, and said projection being adapted to seat on the rim of said eye when said eye is forced between said projection and seat but being too large to pass through said eye, for clamping said eye frictionally between said projection and seat, said eye being centered upon said projection as a pivot.

2. A rotary fly mount support for fishing flies that have an eye at the anterior end, said fly mount comprising a disk adapted to be rotatably mounted and a series of radial resilient arms adjacent said disk and rotatable therewith, each of said arms having a projection formed with a rounded end portion for cooperating clampably with said disk at the periphery thereof, said disk having concave clamping seats, one for each of said projections cooperating therewith to frictionally hold the fly in position between a projection and its corresponding seat, said disk being indented at the outer end of said concave seat, and said projection being adapted to seat on the rim of the eye when the latter is forced between said projection and disk but too large to pass through said eye.

References Cited in the file of this patent

UNITED STATES PATENTS

| | | |
|---|---|---|
| 793,162 | Schmidt | June 27, 1905 |
| 869,774 | Freiman | Oct. 29, 1907 |
| 1,693,827 | Stoltenberg | Dec. 4, 1928 |
| 2,173,395 | Heiner | Sept. 19, 1939 |
| 2,209,953 | Youngquist | Aug. 6, 1940 |
| 2,225,309 | Lawrence | Dec. 17, 1940 |
| 2,459,417 | Dodge | Jan. 18, 1949 |